United States Patent
Sone et al.

(10) Patent No.: US 8,616,788 B2
(45) Date of Patent: Dec. 31, 2013

(54) OPTICAL TRANSCEIVER WITH A SHIELD MEMBER BETWEEN TWO OSAS

(75) Inventors: Hidemi Sone, Yokohama (JP); Toru Ukai, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 396 days.

(21) Appl. No.: 12/959,020

(22) Filed: Dec. 2, 2010

(65) Prior Publication Data
US 2011/0135258 A1 Jun. 9, 2011

(30) Foreign Application Priority Data
Dec. 4, 2009 (JP) .................................. 2009-276671

(51) Int. Cl.
*G02B 6/42* (2006.01)

(52) U.S. Cl.
USPC .............................................. 385/95; 385/88

(58) Field of Classification Search
None
See application file for complete search history.

(56) References Cited

U.S. PATENT DOCUMENTS

| 6,499,890 B2 * | 12/2002 | Gilliland et al. ................ 385/88 |
| 6,755,577 B2 | 6/2004 | Inujima et al. |
| 6,994,480 B2 * | 2/2006 | Inujima et al. .................. 385/92 |
| 7,114,857 B1 * | 10/2006 | Kayner et al. .................. 385/88 |
| 2003/0063424 A1 * | 4/2003 | Inujima et al. ................. 361/115 |
| 2003/0152340 A1 * | 8/2003 | Kurashima ..................... 385/92 |
| 2004/0116165 A1 * | 6/2004 | Huang et al. ............... 455/575.1 |
| 2005/0018978 A1 * | 1/2005 | Nevo et al. ..................... 385/92 |
| 2006/0140552 A1 * | 6/2006 | Mizue et al. .................... 385/92 |
| 2006/0215968 A1 * | 9/2006 | Kayner et al. .................. 385/89 |
| 2007/0189673 A1 * | 8/2007 | Yoshikawa ..................... 385/53 |
| 2008/0292250 A1 * | 11/2008 | Hino ............................... 385/92 |
| 2009/0028557 A1 * | 1/2009 | Togami et al. .................. 398/39 |
| 2010/0178013 A1 * | 7/2010 | Yoshikawa ..................... 385/88 |

* cited by examiner

*Primary Examiner* — Michelle R Connelly

(74) *Attorney, Agent, or Firm* — Venable LLP; Michael A. Sartori; Tamatane J. Aga

(57) ABSTRACT

An optical transceiver provides a TOSA, a ROSA, a base member, a circuit board and a shield member. The shield member is formed by cutting and bending a metal sheet without welding or soldering. The shield member includes a center partition and a pair of sides, which forms two spaces each receiving the TOSA or the ROSA. The center partition has a V-shaped cross section which is able to be inserted into a cut of the circuit board so as to shield the ROSA from the TOSA. The shield member provides a frame ground by being in the bottom of the center partition in contact with the base member and also in contact with the cover.

15 Claims, 13 Drawing Sheets

OPTICAL TRANSCEIVER WITH A SHIELD MEMBER BETWEEN TWO OSAS

BACKGROUND OF THE INVENTION

1. Field of the Invention

The present invention relates to an optical transceiver with a transmitter optical sub-assembly (hereafter denoted as TOSA) and a receiver optical sub-assembly (hereafter denoted as ROSA) within a housing.

2. Related Prior Art

An optical transceiver receives an electrical signal from the host system, converts the electrical signal into an optical signal and transmits the optical signal to an external fiber; concurrently, receives another optical signal, converts this optical signal into an electrical signal and outputs this electrical signal to the host system. Thus, the optical transceiver may enable the full duplex communication between the host system and another system connected with a pair of optical fibers.

An United States patent, the U.S. Pat. No. 6,755,577, has disclosed a type of the optical transceiver including a TOSA, a ROSA, and a circuit board, where each OSA (Optical Sub-Assembly) provides an electrically conductive bracket with a semi-circular body and two legs longitudinally extending from the body. One of the brackets covers lead pins of the TOSA, while, the other bracket covers the lead pins of the ROSA. The lead pins of the TOSA and those of the ROSA may be shielded to the others. This arrangement of the brackets and the lead pins, because the brackets are connected to the ground of the circuit board, may reduce the crosstalk between two OSAs. The brackets thus described are free from the circuit board, the OSAs and other components in the optical transceiver until they are soldered with the ground pattern on the circuit board, which causes less productivity of the optical transceiver.

SUMMARY OF THE INVENTION

An optical transceiver according to the present invention comprises a TOSA, a ROSA, a shield member, a circuit board and a base member. The shield member, which is formed only by cutting and bending a meal sheet without any welding or soldering, has a center partition and a pair of sides. The center partition includes two walls and a bottom connecting two walls. One of walls forms a first space accompanied with one of sides into which the TOSA is set, while, the other of walls forms a second space accompanied with other of sides into which the ROSA set. The base member also formed only by cutting and bending a metal sheet without any welding or soldering, comes in contact with the bottom of the shield member. A feature of the optical transceiver according to the present invention is that the circuit board, which is electrically connected with the TOSA and the ROSA, has a center cut where the center partition of the shield member passes through for the bottom thereof to come in contact with the base member. Thus, the TOSA and the ROSA may be shielded by the center partition, and the shield member may be firmly held between the center cut of the circuit board without any soldering with the circuit board.

The shield member may provide a first ceiling connecting one of walls of the center partition to one of sides, and a second ceiling connecting other of walls to the other of sides. Thus, the first space may be surrounded by one of walls, one of sides and the first ceiling, while, the second space may be surrounded by the other of walls, the other of sides, and the second ceiling, which may further securely shield the ROSA from the TOSA. The center cut may divide front portion of the circuit board into a first portion connected to the TOSA and a second portion connected to the ROSA. The first portion may provide a ground pattern sandwiched by insulating layer constituting the first portion. The ground pattern may extend from an edge of the center cut to another edge in the first portion of the circuit board. Thus, the first space may be surrounded by the ground pattern in addition to one of the walls, one of the sides, and the first ceiling, which may further shield the first space.

The first wall, the second wall, and the bottom in the center partition may form a V-shaped cross section. When the ceilings of the shield member come in contact with the cover and are pushed thereby, a distance between the walls is expanded, which firmly abuts the walls against the circuit board. The bottom of the center partition may provide, in at least a portion thereof, a slit extending along the longitudinal direction. The slit may make the expansion of the walls by being pushed by the cover in facilitated and may suppress the stress affected to the circuit board.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF PREFERRED EMBODIMENTS

Next, some preferred embodiments will be described as referring to accompanying drawings. In the description of the drawings, the same elements will be referred by the same numerals or the symbols without overlapping explanations.

Figure 1:
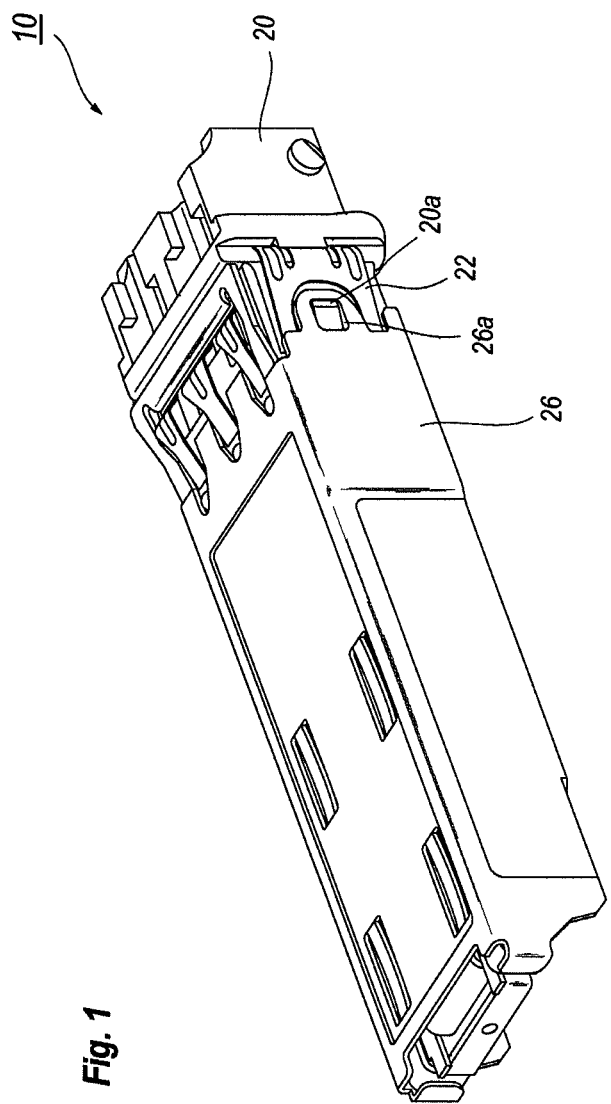
FIG. 1 is a perspective view showing an optical transceiver according to an embodiment of the present invention.
Figure 2:
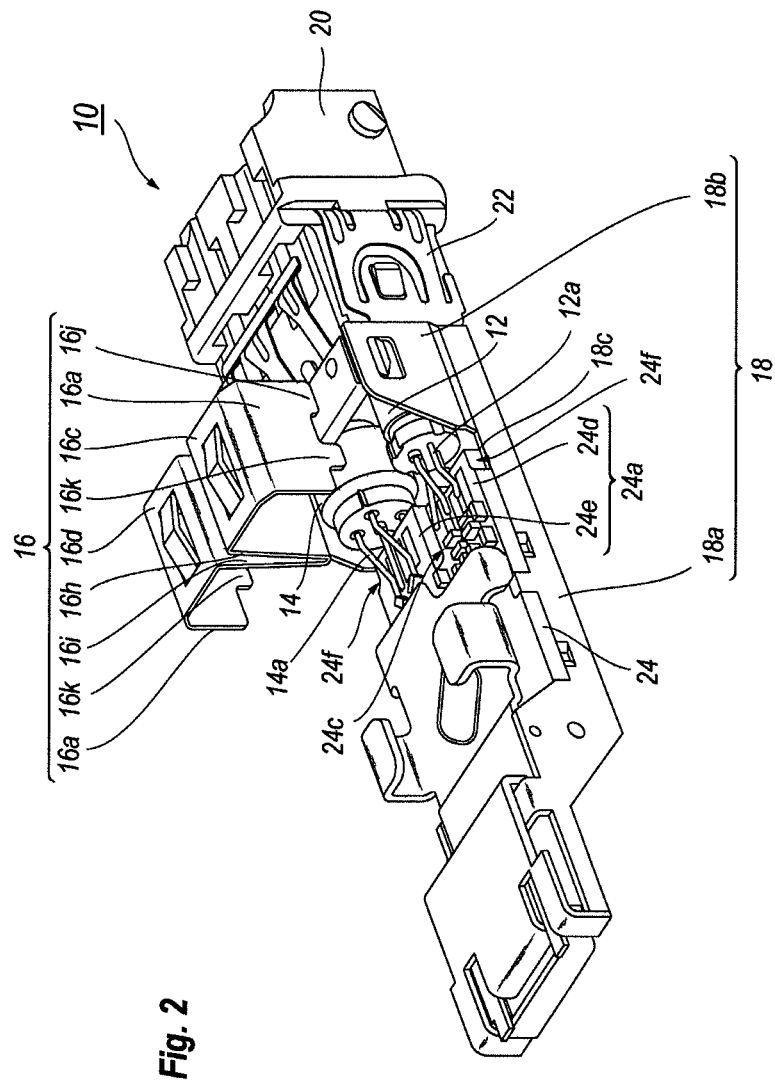
FIG. 2 is an exploded view of the optical transceiver shown in FIG. 1.
Figure 3:
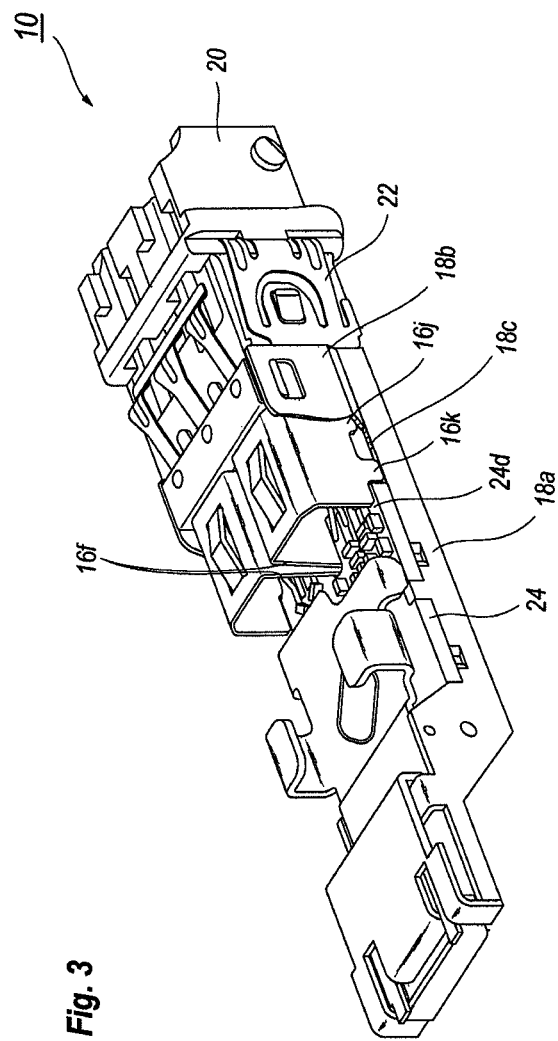
FIG. 3 is a perspective view shown an inside of the optical transceiver shown in FIG. 1.

FIG. 1 is an outer appearance of an optical transceiver according to an embodiment of the present invention, while, FIGS. 2 and 3 are perspective views shown an inside of the optical transceiver 10 shown in FIG. 1. FIG. 2 removes a cover and shows a status just before the installation of a shield member, and FIG. 3 also removers the cover and sets the shield member.

The optical transceiver 10 shown in FIGS. 1 to 3 includes a transmitter optical sub-assembly (TOSA) 12, a receiver optical sub-assembly (ROSA) 14, a shield member 16 and a base member 18 as primary components. The optical transceiver 10 may further include an optical receptacle 20, a shield finger 22, a circuit board 24, and a cover 26. In the description presented below, an upper direction corresponds to a side of the shield member 16 with respect to the base member 18, while, the bottom side corresponds to the opposite thereto; and the front side corresponds to the side of the optical receptacle 20 with respect to the circuit board, and the rear side is opposite thereto.

The TOSA 12 emits signal light by receiving an electrical signal. The TOSA 12 may include, as a light-emitting device, a semiconductor laser diode (LD), a housing to enclose the LD therein and a sleeve to couple the LD optically with an external fiber optical fiber by receiving a ferrule within which the external fiber is secured. The housing may include a stem to mount the LD thereon and a cap fixed to the stem to seal a space in which the LD is enclosed air-tightly. A plurality of lead pins 12a extends outwardly from the stem to be in electrically contact with the circuit on the circuit board 24.

The ROSA 14 generates an electrical signal by receiving an optical signal from an external fiber which is different from the fiber coupled with the LD. The ROSA 14 may include, as a light-receiving device, a semiconductor photodiode (PD), a housing to enclose the PD therein, and a sleeve to couple the PD with the external fiber secured in the sleeve. Another plurality of lead pins 14a extends outwardly from the stem of the ROSA housing to be in electrically contact with the circuit on the circuit board 24.

The optical receptacle 20 receives an external optical connector that provides the external fibers to be coupled with the TOSA 12 and the ROSA 14, respectively. The optical receptacle 20 provides two inner spaces, one of which receives the sleeve of the TOSA 12, while, the other of which receives the sleeve of the ROSA 14. The external optical connector may optically couple with these sleeves by mating with the optical receptacle 20 from the front side.

The shield finger 22 is set around a rear portion of the optical receptacle 20 so as to trace the outer shape thereof. The shield finger 22 may suppress the electro-magnetic-interference (EMI) noise leaked from a gap between the optical transceiver 10 and a metal cage (not shown in figures) provided in the host system, into which the optical transceiver 10 is set, by coming in contact with the metal cage. The shielding finger 22 may also reduce the EMI noise leaked from a gap between the optical receptacle and the cover 26.

Figure 4:
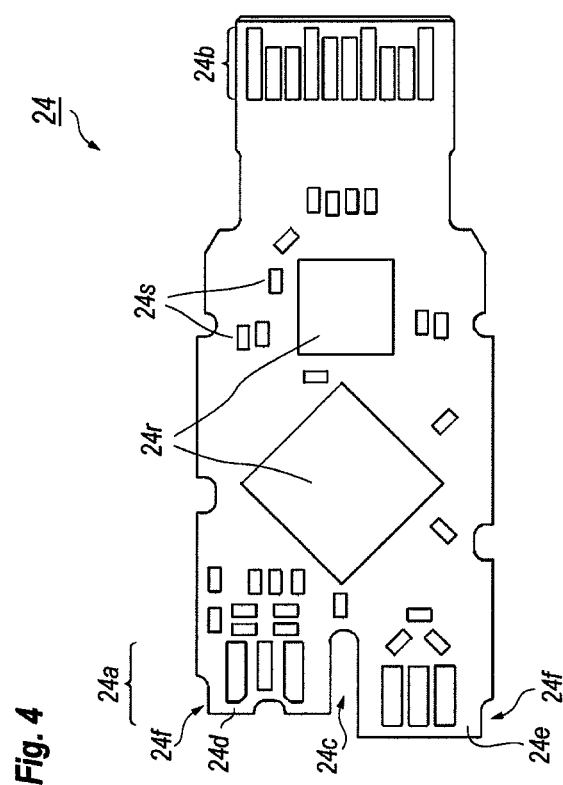
FIG. 4 is a plan view of a circuit board installed in the optical transceiver according to the present invention.

FIG. 4 is a plan view of one embodiment of the circuit board 24. As shown in FIGS. 2 and 4, the circuit board 24 mounts a plurality of ICs 24r and a plurality of discrete components 24s thereon. The electronic circuit including such electrical components is electrically coupled with the TOSA 12 and the ROSA in the front end 24a thereof. On the other hand, the rear end of the circuit board 24 provides an electrical plug 24b which is to be mated with an electrical connector provided in a deep end of the metal cage of the host system when the optical transceiver 10 is inserted into the metal cage.

The circuit board 24 shown in FIG. 4 may provide a cut 24c in the front end 24a thereof, which divides the front end 24a into two portions, one of which 24d is connected with the lead pins 12a of the TOSA 12, while the other 24e is connected with lead pins 14a of the ROSA 14. The base member 18 of the optical transceiver 10, as shown in FIGS. 2 and 3, mounts the TOSA 12, the ROSA 14, and the circuit board 24 thereof. The base member 18 may be made of metal and formed only by cutting and bending a metal sheet without any screwing, welding or soldering.

The base member 18 provides a pair of side walls 18a each formed by bending a metal sheet constituting the base member 18 in both side ends of the bottom 18d thereof. The circuit board 24 is mounted on the top 18c of this side wall 18a. More specifically, the top 18c of the side wall 18a provides a portion bent inward to expand an area to mount the circuit board 24 thereof. A front portion 18b of the side wall 18a is formed taller compared with that of a center portion and a width between the front portion 18b is slightly greater than that between the center portions. That is, the front portion 18b, in a part above the level corresponding to the top 18c of the side wall 18a, protrudes outwardly from the center portion by an amount substantially equal to a thickness of the shield member 16. Thus, the front portion 18b forms a step between a top part and a bottom part that continues from the center portion.

Figure 5:
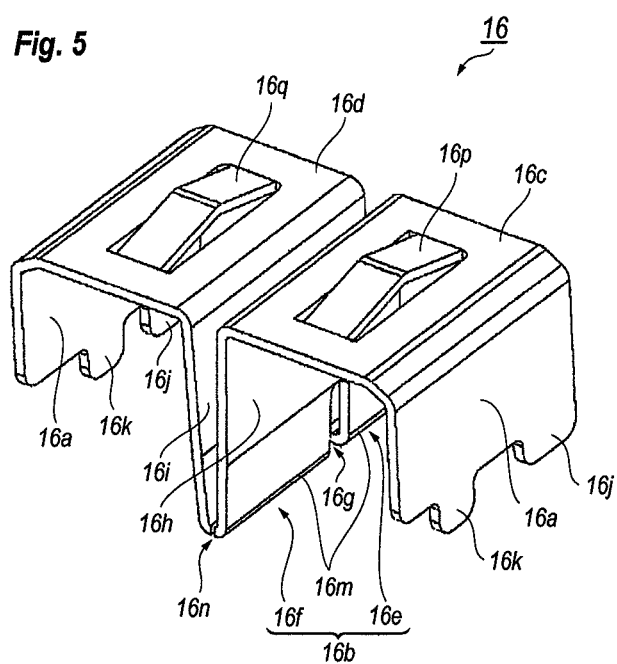
FIG. 5 is a perspective view of the shield member installed in the optical transceiver according to the present invention.
Figure 6:
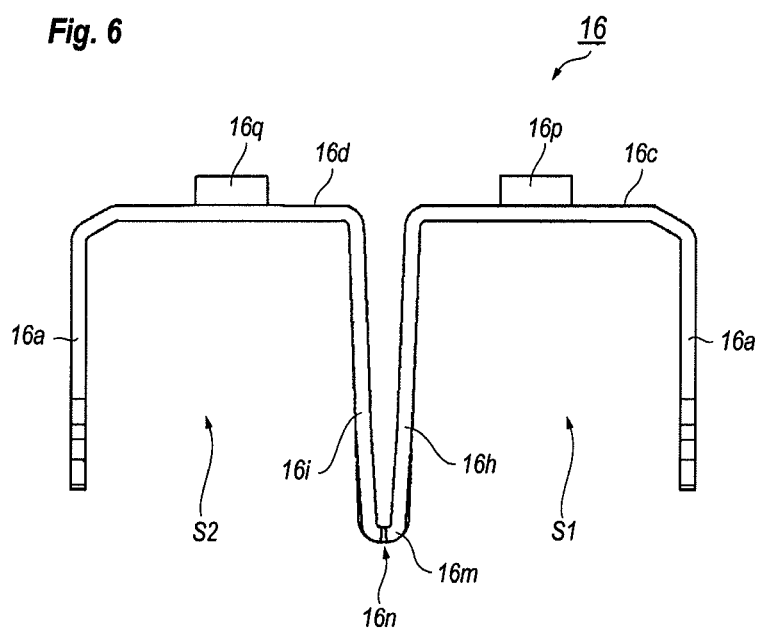
FIG. 6 is a rear view of the shield member shown in FIG. 5.

The base member 18 also mounts the shield member 16. FIG. 5 is a perspective view of the shield member 16, while, FIG. 6 is a rear view of the shield member 16. The shield member 16 may be formed by cutting and bending a metal sheet without welding or other processes. The shield member 16 includes a pair of sides 16a, a center partition 16b, and first and second ceilings, 16c and 16d. The side 16a has a plane shape extending along the longitudinal direction of the optical transceiver 10, and provides a front leg 16j and a rear leg 16k, each protruding downward from the bottom edge of the side 16a but the length of the protruding is lesser in the front leg 16j compared with the rear leg 16k.

The center partition 16b includes first and second plates, 16h and 16i, and a bottom 16m. The center partition 16b shown in FIGS. 5 and 6 is divided into a front portion 16e and a rear portion 16f by a slit 16g extending upwardly from the bottom 16m. The shield member 16 may provide another slit 16n in the bottom 16m of the center partition 16b. These slits, 16g and 16n, may reduce a stress caused by the center partition 16b against the circuit board 24 when the rear portion 16f of the center partition 16b is set in the cut 24c. The front portion 16e includes two plates, 16h and 16i, and the bottom 16m in the front portion thereof, while, the rear portion 16f includes two plates, 16h and 16i, and the bottom 16m in the rear portion thereof. The rear portion 16f has a V-shaped cross section viewed from the rear of the optical transceiver 10, while the front portion 16e may have a U-shaped cross section. That is, a width of the front portion 16e may be wider than that of the rear portion 16f, which makes it easy for the rear portion 16f to be inserted into the center cut 24c of the circuit board and makes it secure for the front portion 16e in the bottom 16m thereof to come to the bottom 18d of the base member 18.

The first ceiling 16c connects the top of one side 16a with the top of one of the first plate 16h, while, the second ceiling 16d connects the top of the other side 16A with the second plate 16i of the center partition 16b. The first ceiling 16c of the present embodiment provides an elastic tab 16p, while, the other ceiling 16q provides another elastic tab 16q. These elastic tabs, 16p and 16q, are formed by cutting a portion of respective ceilings, 16c and 16d, by two slits extending in parallel along the longitudinal direction of the optical transceiver 10, and protruding a center thereof.

The shield member 16 thus described above provides a first space S1 formed by the first ceiling 16c, one of the side 16a and the first plate of the center partition 16b, and another space S2 formed by the second ceiling 16d, the other side 16a, and the second plate 16*i* of the center partition 16*b*. The shield member 16 is set on the base member 18 as shown in FIGS. 2 and 3.

Figure 7:
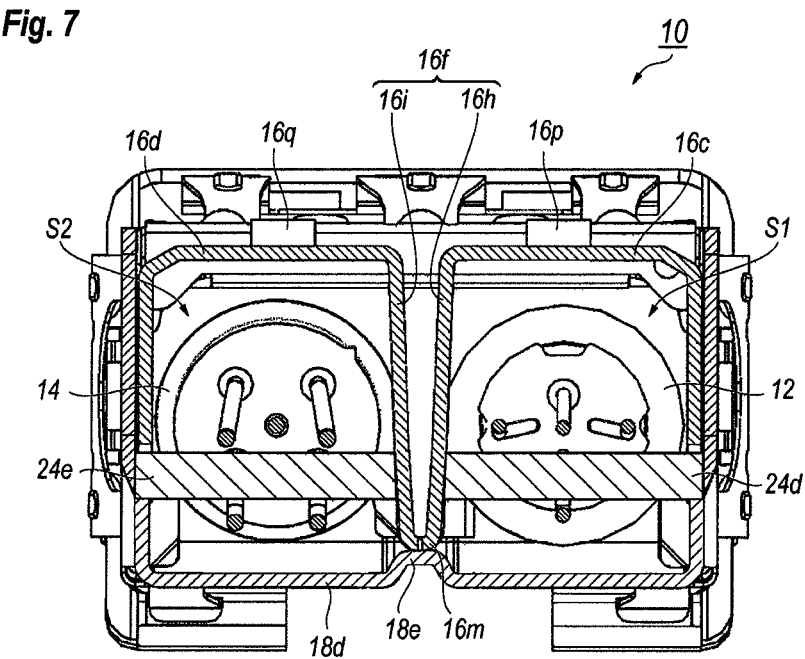
FIG. 7 is a cross section of the optical transceiver shown in FIG. 1, which is viewed from the rear.
Figure 8:
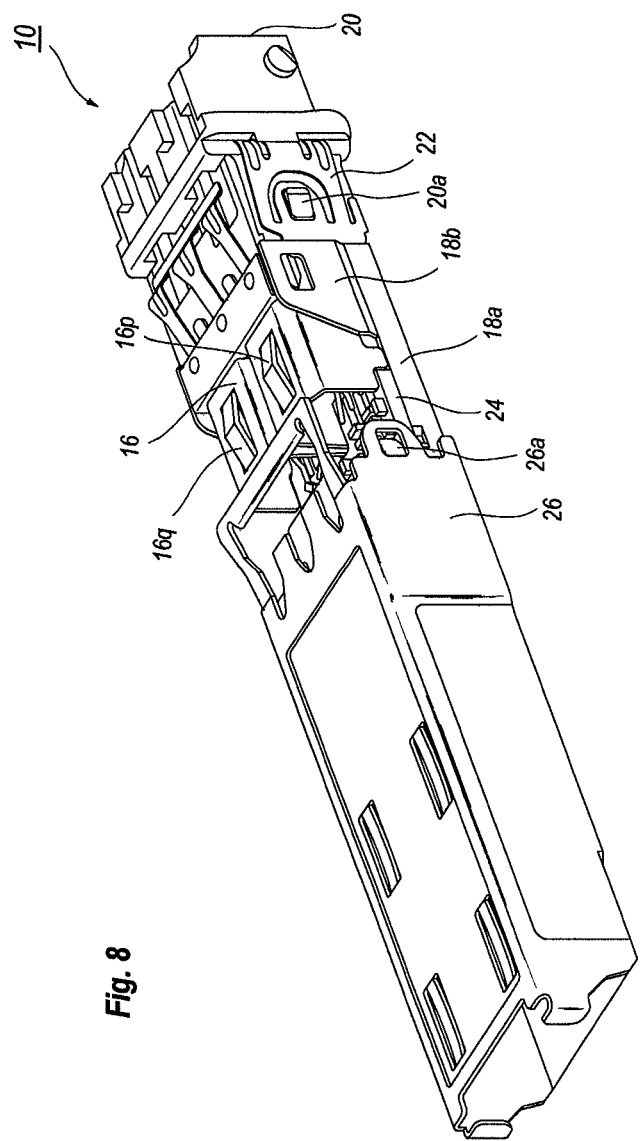
FIG. 8 shows a process to assembly the optical transceiver shown in FIG. 1.

FIG. 7 is across section of the optical transceiver 10 viewed from the rear thereof. Referring to FIGS. 2, 3 and 7, the shield member 16 is mounted on the base member 18 so as to receive the TOSA 12 and the ROSA 14 in the first space 51 and the second space S2, respectively.

Moreover, when the shield member 16 is set on the base member 18, the rear leg 16*k* is received in the side pocket 24*f* formed in the side of the front end 24*a* of the circuit board 24, a portion of side 16*a* rear of the rear leg 16*k* is in contact with the top surface of the circuit board 24, and the tip of the rear leg 16*k* comes in contact with the top 18*c* of the side wall 18*a* of the base member 18. The front leg 16*j* in the tip end thereof abuts against the step between the upper and lower portions of the front portion 18*b* of the base member 18. The front end of the shield member 16 abuts against the rear end the optical receptacle 20 so as to put the shielding finer 22 therebetween.

The bottom 16*m* of the center partition 16*i*, comes in contact with the bottom 18*d* of the base member 18 as shown in FIG. 7. The base member 18 of the present embodiment provides a rib 18*e* extending longitudinally, and the bottom 18*m* comes in contact with this rib 18*e*. The rib 18*e* may reinforce the strength of the base member 18 along the longitudinal direction.

The shield member 16 may be positioned in up and down direction setting the pair of sides 16*a* and the center partition 16*b* between the base 18 and the cover 26, while, it is positioned in the lateral direction by being put between the upper portion of the front portion of the side walls 16*a*, and in the longitudinal direction by coming in contact with the front edge of the circuit board 24 and with the rear end of the optical receptacle 20 through the shield finger 22.

Setting the shield member 16 on the base member 18, the rear portion 16*f* of the center partition 16*b* is set within the cut 24*c* of the circuit board 24. The bottom 16*m* of the rear portion 16*f* provides the slit 16*n* extending along the longitudinal direction. This slit 16*n* may extend in the whole rear portion 16*f*, that is, the first plate 16*h* may be fully divided from the end plate in the rear portion 16*f*, or may be provided in a portion of the rear portion 16*f*. The slit 16*n* may reduce the stress applied to the circuit board 24 when the shield member 16 is set within the front slit 24*c* of the circuit board 24.

Referring back to FIG. 1 again, the cover 26 forms a space longitudinally extending, in which the shield member 16, the base 18 and the circuit board 24 are enclosed. The cover 26 is latched with the optical receptacle 20 by hooking a side opening 26*a* with the side projection 20*a* of the optical receptacle 20. Enclosing the shield member 16 with the cover 26, the elastic tab, 16*p* and 16*q*, comes in contact with an inner surface of the cover 26; accordingly, the elastic tab, 16*p* and 16*q*, is pushed inwardly, which firmly and securely abuts the bottom 16*m* of the shield member 16 against the bottom 18*d* of the base member 18.

Next, a process to assembly the optical transceiver 10 described above will be explained. The process of the present embodiment first solders the lead pins of the TOSA 12 and those of the ROSA 14 with the circuit board 24. The circuit board 24 is set on the base member 18 after the soldering as shown in FIG. 2. Secondly, the shield member 16 is mounted on the base member 18 so as to insert the rear portion 16*f* of the center partition 16*b* into the center cut 24*c* of the circuit board 24 shown in FIG. 3. Finally, the cover 26 is assembled with the optical receptacle 20 so as to enclose the shield member 16, the base member 18 and the circuit board 24 therein by sliding from the rear to the front of the optical transceiver 10. Thus, the optical transceiver 10 may be completed.

The shield member 16 of the present invention may come in contact with the base 18, which may provide the frame ground, by passing through the center cut 24*c* and passing between the TOSA 12 and the ROSA 14. Thus, an EMI shield may be provided between the TOSA 12 and the ROSA 14 without any soldering. Moreover, the center partition 16*b* has a doubled wall of the first plate 16*h* and the second plate 16*i* forming the V-shaped cross section in the rear and the U-shaped cross section in the front; accordingly, the EMI shield may be further effective.

The shield member 16 sets the TOSA 12 in the first space S1 and the ROSA 14 in the second space S2. Thus, the TOSA 12 and the ROSA 14 are covered in a whole periphery by the shield member 16 and the base member 18, which may effectively reduce the EMI radiation from leaking from the TOSA 12 and the ROSA 14.

The present invention may have various embodiment not restricted to that illustrated in previous figures. Next, various arrangements of the optical transceiver 10 will be described.

Figure 9:
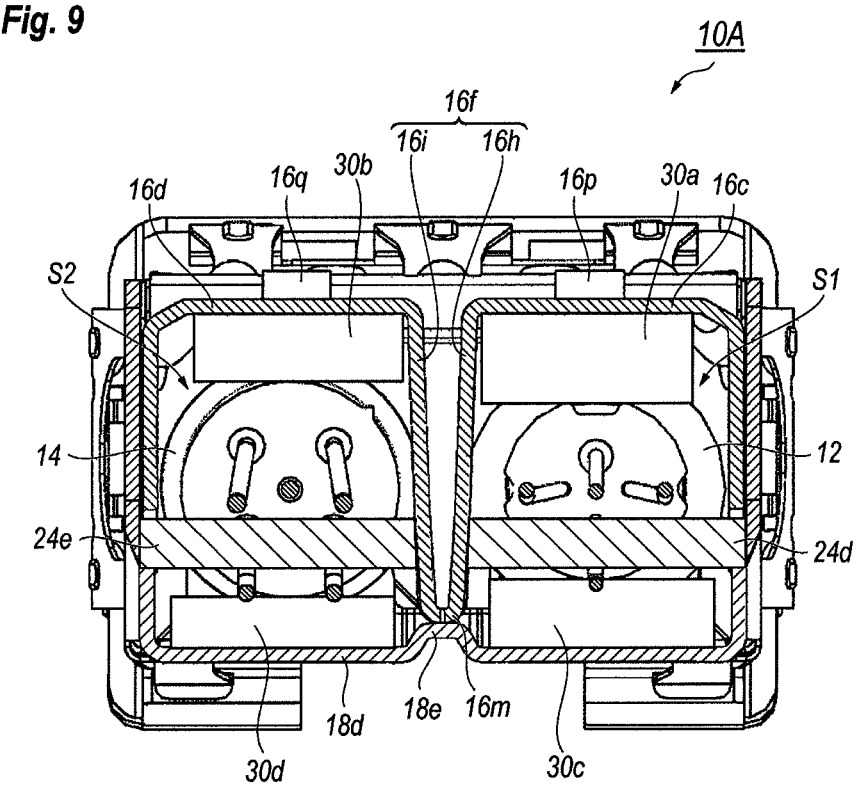
FIG. 9 is a cross section of a modified optical transceiver, which provides a plurality of thermal sheet in contact with the shield member and the OSA.

FIG. 9 is a cross section showing a first modification of the optical transceiver shown in FIG. 7. The optical transceiver 10A shown in FIG. 9 provides a thermal sheet 30*a* between the first ceiling 16*c* and the TOSA 12, and another sheet 30*b* between the second ceiling 16*d* and the ROSA 14. Moreover, the third thermal sheet 30*c* may be put between the bottom 18*d* of the base member 18 and the TOSA 12, while the fourth thermal sheet 30*d* may be arranged between the bottom 18*d* and the ROSA 14.

A conventional optical transceiver without shield member 16 often provides the thermal sheet between the OSA and the cover. However, as previously explained, the cover 26 is set so as to slide from the rear to the front of the optical transceiver; the thermal sheet in the conventional optical transceiver often prevents the cover from sliding smoothly. The modified optical transceiver 10A shown in FIG. 9 may easily assemble the cover 26 with the optical receptacle 20 by sliding the cover 26 from the rear because the thermal sheets, 30*a* to 30*b*, are put between the shield member 16 and the OSAs, 12 and 14. The heat dissipated from the OSAs, 12 and 14, to the thermal sheets, 30*a* and 30*b*, and transferred to the shield member 16, may be effectively conducted to the cover 26 because the elastic tabs, 16*p* and 16*q*, are securely and thermally in contact with the cover 26. Moreover, because the center partition 16*b* is divided into two parts, 16*h* and 16*i*, between which comes in physically and thermally contact with the bottom 18*d* of the base 18, the TOSA 12 and the ROSA 14 may be thermally isolated from the other.

Figure 10:
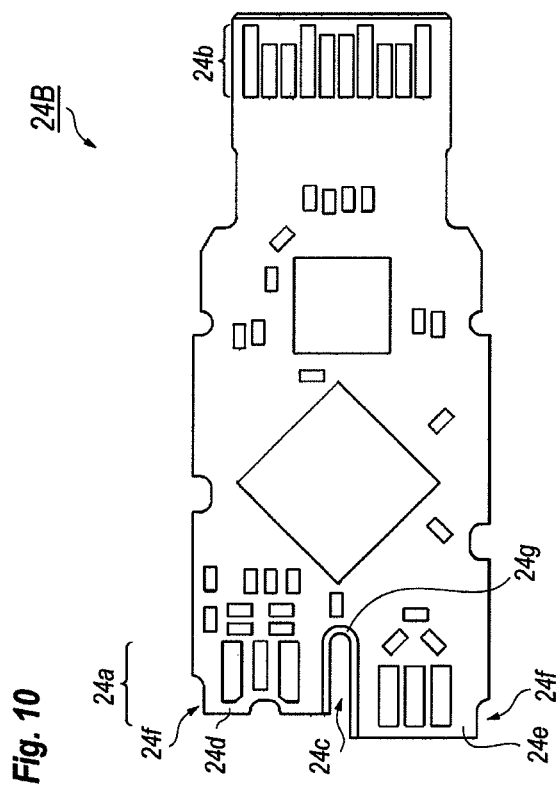
FIG. 10 is a plan view of a modified circuit board.
Figure 11:
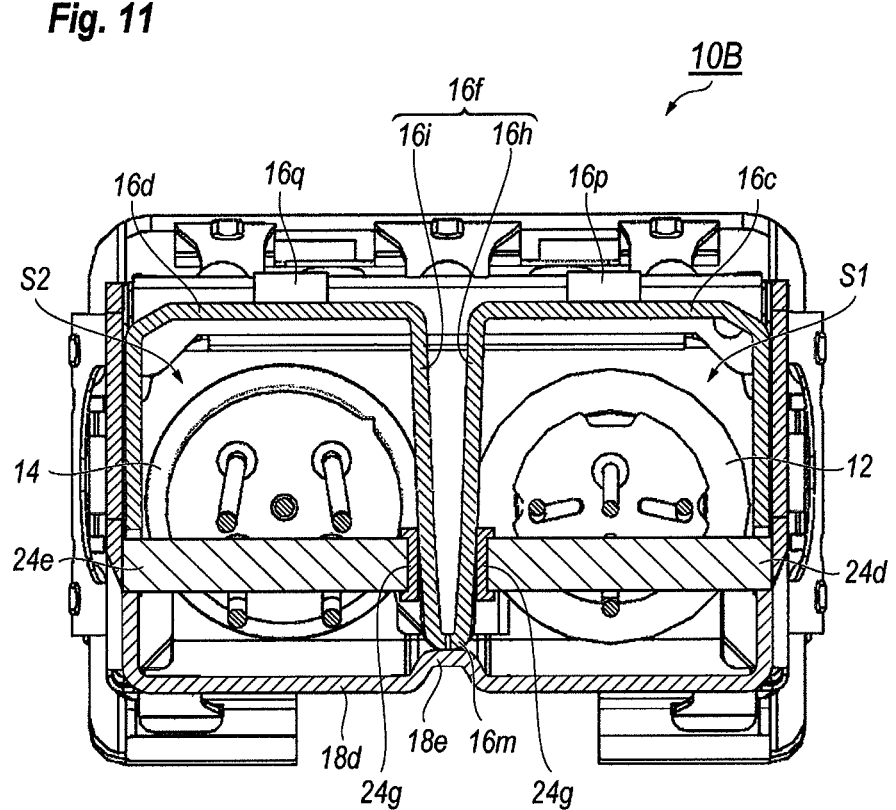
FIG. 11 is a cross section of a modified optical transceiver that installs the circuit board shown in FIG. 10.

FIG. 10 is a plan view showing a modified circuit board 24B, and FIG. 11 is a cross section of another type of the optical transceiver 10B installing the circuit board 24B shown in FIG. 10. The modified circuit board 24B has a feature different from the circuit board 24 shown in FIG. 4 that the center cut 24*c* provides a ground pattern 24*g* along the edge and the side surface thereof.

When the center partition 16*b* in the bottom 16*m* thereof comes in contact with the bottom 18*d* of the base member 18 by being pushed in the elastic tabs, 16*p* and 16*q*, by the cover 26, the force affected by the cover 26 outwardly spreads the first and second plates, 16*h* and 16*i*, which makes the plates to come in physically contact with the edge of the center cut 24*c* firmly. The shield member 16 may be securely come in electrically contact with not only the base member 18 but the frame ground on the circuit board 24B.

Figure 12:
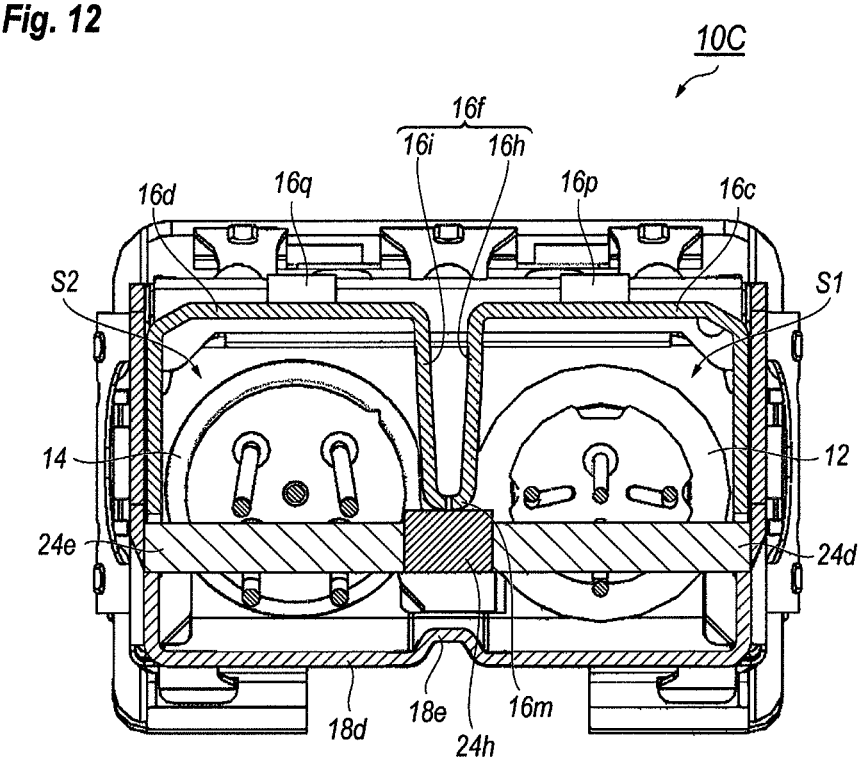
FIG. 12 is a cross section of still modified optical transceiver according to an embodiment of the present invention.

FIG. 12 is a cross section of still another optical transceiver 10C according to a modified embodiment of the present invention. The optical transceiver 10C provides an electrode 24h on the circuit board 24 which provides the frame ground; and the bottom 16m of the shield member 16 does not abut against the base member 18 but the electrode 24h on the circuit board 24.

Figure 13:
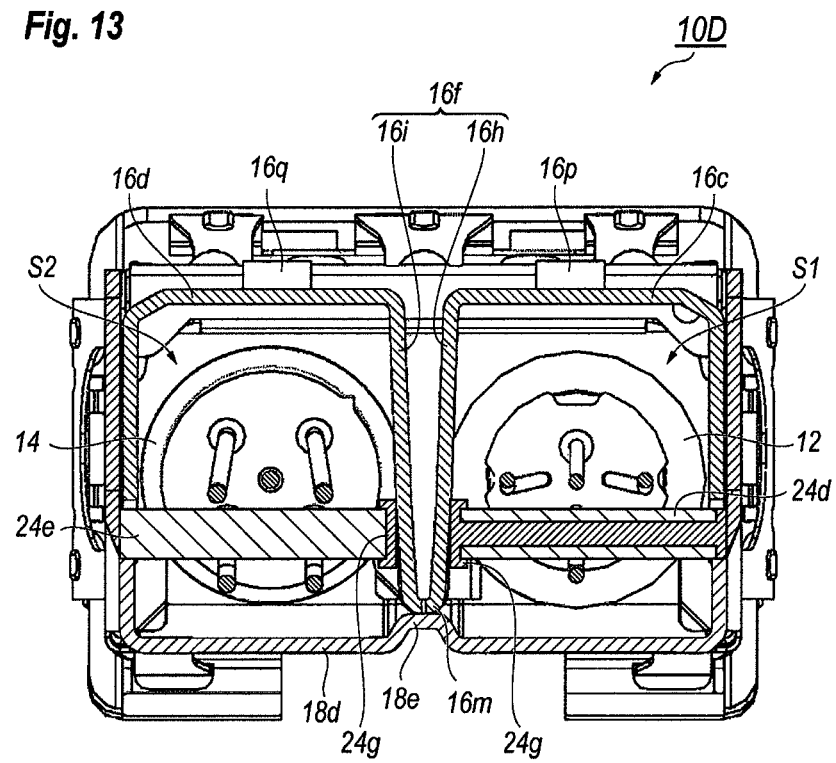
FIG. 13 is a cross section of still another optical transceiver modified from the optical transceiver shown in FIG. 11.

FIG. 13 is another cross section of an optical transceiver 10D according to another modification of the present invention. The optical transceiver 10D shown in FIG. 13 provides another type of the circuit board 24 which has a ground pattern 24g modified from the pattern 24g shown in FIG. 11. That is, the ground pattern 24g shown in FIG. 13 extends along the edge of the center cut 24c, and laterally extends from the edge of the center cut 24c to the other edge of the circuit board 24 as being sandwiched by insulating layers in the first front portion 24d. The first front portion 24d of the circuit board 24 is provided for the transmitter unit of the optical transceiver 10D; accordingly, the transmitter unit may be surrounded by the frame ground, which may enhance the EMI tolerance of the optical transceiver 10D.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An optical transceiver, comprising:
    a transmitter optical sub-assembly (TOSA);
    a receiver optical sub-assembly (ROSA);
    a shield member with a center partition and a pair of sides, said center partition including two walls and a bottom configured to connect said walls, one of said walls forming a first space accompanied with one of said sides, and another of said walls forming a second space accompanied with another of said sides, wherein said TOSA is set in said first space and said ROSA is set in said second space;
    a circuit board electrically connected with said TOSA and said ROSA, said circuit board including a center cut; and
    a base member configured to mount said circuit board and said shield member thereon,
    wherein said bottom of said center partition comes into physical contact with said base member by passing said two walls through said center cut of said circuit board.

2. The optical transceiver of claim 1,
    wherein said center cut of said circuit board divides a front portion of said circuit board into a first portion and a second portion, said first portion being coupled with said TOSA and said second portion being coupled with said ROSA,
    wherein said first portion and said second portion are shielded with said center partition.

3. The optical transceiver of claim 2,
    wherein said TOSA provides a lead pin electrically connected to said circuit board, and said ROSA provides another lead pin connected to said circuit board,
    wherein said lead pin of said TOSA and said lead pin of said ROSA are shielded with respect to each other by said center partition.

4. The optical transceiver of claim 1,
    wherein said center partition provides a slit extending in a vertical direction of said optical transceiver, said slit dividing said center partition into a front portion and a rear portion, said rear portion passing through said center cut of said circuit board.

5. The optical transceiver of claim 4,
    wherein said front portion has a U-shaped cross section.

6. The optical transceiver of claim 4,
    wherein said rear portion has a V-shaped cross section with said bottom.

7. The optical transceiver of claim 6,
    wherein at least said rear portion provides a slit in a portion of said bottom, said slit extending in a longitudinal direction of said optical transceiver.

8. The optical transceiver of claim 1,
    wherein said center slit has a conductive pattern along an edge of said center cut and a side surface of said circuit board exposed in said center cut,
    wherein said center partition comes in contact with said conductive pattern.

9. The optical transceiver of claim 8,
    wherein said conductive pattern extends from said edge of said center cut to another edge of said circuit board as being sandwiched by insulating layers of said circuit board.

10. The optical transceiver of claim 9,
    wherein said first space is surrounded by one of said walls of said shield member, said one of sides of said shield member, and said conductive pattern in said circuit board.

11. The optical transceiver of claim 1,
    further comprising an electrically conductive cover,
    wherein said shield member provides a first ceiling and a second ceiling, said first ceiling connecting one of said walls to one of said sides, said second ceiling connecting another of said walls to another of said sides, and
    wherein said first ceiling and said second ceiling come in contact with said cover.

12. The optical transceiver of claim 11,
    wherein said first ceiling and said second ceiling each provides an elastic tab coming in contact with said cover.

13. The optical transceiver of claim 11,
    further comprising a thermal sheet between said first ceiling and said TOSA, and another thermal sheet between said second ceiling and said ROSA.

14. The optical transceiver of claim 1,
    wherein said base member provides a rib extending along a longitudinal direction of said optical transceiver,
    wherein said bottom of said center partition comes in contact with said rib.

15. The optical transceiver of claim 1,
    further comprising an optical receptacle and a shield finger assembled with said optical receptacle,
    wherein said shield member abuts against said optical receptacle by putting said shield finger between said optical receptacle and said shield member.

* * * * *